United States Patent [19]
Sautter et al.

[11] 4,377,821
[45] Mar. 22, 1983

[54] ARRANGEMENT FOR PROVIDING A FLICKERLESS ORDERED DITHER IMAGE FOR A VIDEO DISPLAY

[75] Inventors: Helmuth O. Sautter, Middletown; Donald B. Swicker, Wall Township, Monmouth County, both of N.J.

[73] Assignee: Bell Telephone Laboratories, Incorporated, Murray Hill, N.J.

[21] Appl. No.: 305,165

[22] Filed: Sep. 24, 1981

[51] Int. Cl.³ .............................................. H04N 7/12
[52] U.S. Cl. ................................... 358/133; 358/160; 358/209
[58] Field of Search ...................... 358/133, 160, 209; 364/515

[56] References Cited
U.S. PATENT DOCUMENTS 3,953,668  4/1976  Judice .................................. 358/240
4,013,828  3/1977  Judice .................................. 358/133

Primary Examiner—Robert L. Griffin
Assistant Examiner—Edward L. Coles
Attorney, Agent, or Firm—S. R. Williamson

[57] ABSTRACT

A flickerless video display for a gray scale image is obtained using binary picture elements in an interlaced field format. The flicker is eliminated by causing each display point on a line of the interlaced field to be vertically paired with and have an intensity equal to a display point which is located on an adjacent line. Incorporating this arrangement into a display system involves a modification only to the transmitter.

10 Claims, 5 Drawing Figures

| 0 | 32 | 8 | 40 | 2 | 34 | 10 | 42 |
|---|----|---|----|---|----|----|----|
| 48 | 16 | 56 | 24 | 50 | 18 | 58 | 26 |
| 12 | 44 | 4 | 36 | 14 | 46 | 6 | 38 |
| 60 | 28 | 52 | 20 | 62 | 30 | 54 | 22 |
| 3 | 35 | 11 | 43 | 1 | 33 | 9 | 41 |
| 51 | 19 | 59 | 27 | 49 | 17 | 57 | 25 |
| 15 | 47 | 7 | 39 | 13 | 45 | 5 | 37 |
| 63 | 31 | 55 | 23 | 61 | 29 | 53 | 21 |

220

| 0 | 48 | 32 | 16 | 8 | 56 | 40 | 24 | 2 | 50 | 34 | 18 | 10 | 58 | 42 | 26 |
|---|----|----|----|---|----|----|----|---|----|----|----|----|----|----|----|
| 12 | 48 | 44 | 16 | 4 | 56 | 36 | 24 | 14 | 50 | 46 | 18 | 6 | 58 | 38 | 26 |
| 12 | 60 | 44 | 28 | 4 | 52 | 36 | 20 | 14 | 62 | 46 | 30 | 6 | 54 | 38 | 22 |
| 3 | 60 | 35 | 28 | 11 | 52 | 43 | 20 | 1 | 62 | 33 | 30 | 9 | 54 | 41 | 22 |
| 3 | 51 | 35 | 19 | 11 | 59 | 43 | 27 | 1 | 49 | 33 | 17 | 9 | 57 | 41 | 25 |
| 15 | 51 | 47 | 19 | 7 | 59 | 39 | 27 | 13 | 49 | 45 | 17 | 5 | 57 | 37 | 25 |
| 15 | 63 | 47 | 31 | 7 | 55 | 39 | 23 | 13 | 61 | 45 | 29 | 5 | 53 | 37 | 21 |
| 0 | 63 | 32 | 31 | 8 | 55 | 40 | 23 | 2 | 61 | 34 | 29 | 10 | 53 | 42 | 21 |

ARRANGEMENT FOR PROVIDING A FLICKERLESS ORDERED DITHER IMAGE FOR A VIDEO DISPLAY

BACKGROUND OF THE INVENTION

1. Technical Field

The present invention relates to video signal processing in general, and in particular, to the processing of ordered dither images for displaying in an interlaced field format.

2. Description of the Prior Art

Video signals are invariably generated in an analog form. To obtain the advantages of digital transmission, it is necessary to quantize the signal in some way. In ordinary quantization, the output levels of a quantizer are uniformly spaced throughout the range of the input signal. For example, in the absence of any coding, it would require six bits to send a signal quantized to 64 levels. And, in practice, at least 64 levels are required to produce a high quality picture.

A strong incentive to reduce the number of levels exists since it would reduce the number of bits that has to be transmitted. If the quantizer step size is doubled, for example, the number of levels can be halved; and the bit rate of the source can be reduced from, say, six to five bits per sample. If this is done, the picture quality is degraded, but primarily for only one type of picture material, i.e., those areas in which the luminescence changes slowly or low-detail areas. The degradation takes the form of curved lines which look very much like contour lines on a map; thus, this type of degradation is referred to as contouring. In order to eliminate the objectionable effect of contouring, an effect similar to increasing the number of levels can be achieved by adding a dither signal to the input signal. This deterministic or ordered dither was originally introduced by J. O. Limb in an article entitled "Design of Dither Wave Forms for Quantized Visual Signals," *Bell System Technical Journal*, Vol. 48, pp. 2555–2582 (1969).

Ordered dither, or more simply, dither, is a video signal processing technique which provides bi-level display systems with gray-scale, or continuous-tone capability. Images in bi-level display systems typically comprise a matrix of individually closely spaced display cells, each of which resides in one of two visual states. That is, each display cell is either completely energized ON or completely deenergized OFF.

Dither processing is one known technique for determining which cells should be ON and which should be OFF. The image to be produced is divided into a matrix of picture elements (PELs), each PEL corresponding to a respective cell in the display system. A dither threshold value is assigned to each PEL from a predetermined dither matrix. If the intensity of any given PEL is greater than the dither threshold value assigned thereto, the corresponding display cell is turned ON. Otherwise, it is maintained OFF.

Although ordered dither was developed principally for use in bi-level display systems, in some instances, it is desirable to display dithered images on a conventional cathode ray tube (CRT) display using the CRT in a bi-level mode. Such arrangements advantageously minimize both transmission bandwidth requirements and display hardware costs at the present time. In addition, CRT displays are presently less expensive than plasma or other bi-level display panels.

A problem arises, however, because conventional CRT systems use an interlaced field format. When a dithered image is displayed in this format, the two fields of each frame have unequal brightness because of the way in which the threshold values of a dither matrix are spatially distributed therein. The result is an annoying flicker in the displayed image. One technique for minimizing this flicker was proposed in U.S. Pat. No. 3,953,668, issued to C. N. Judice on Apr. 27, 1976. In this arrangement, the flicker, which results when an ordered dither image is displayed in an interlaced field format, is eliminated by energizing each PEL of te display to have an intensity proportional to the average intensity of a cluster of PELs of the dithered image, rather than the intensity of a single one of the PELs. While such an arrangement has been found satisfactory in a bi-level display system in which the receiver incorporates a circuit for displaying the average intensity of a cluster of PELs, some arrangements do not readily allow for the receiver modification required for this approach.

SUMMARY OF THE INVENTION

An arrangement which provides for displaying an ordered dither image in an interlaced field format using binary picture elements has been developed. The arrangement uses vertical PEL pairing that is applied at the transmitter and requires no modification at the receiver. By arranging the PELs such that each one of the PELs on the rows of the interlaced field is vertically paired with and has an intensity equal to a PEL which is located on one of the adjacent rows, the flicker in the display is eliminated.

BRIEF DESCRIPTION OF THE DRAWING

The invention may be clearly understood from a consideration of the following detailed description of the illustrative embodiments of the invention and the accompanying drawing in which:

FIG. 2 illustrates two ordered dither matrices with actual threshold values or effective threshold values assigned in each sample point;

DETAILED DESCRIPTION

Figure 1:
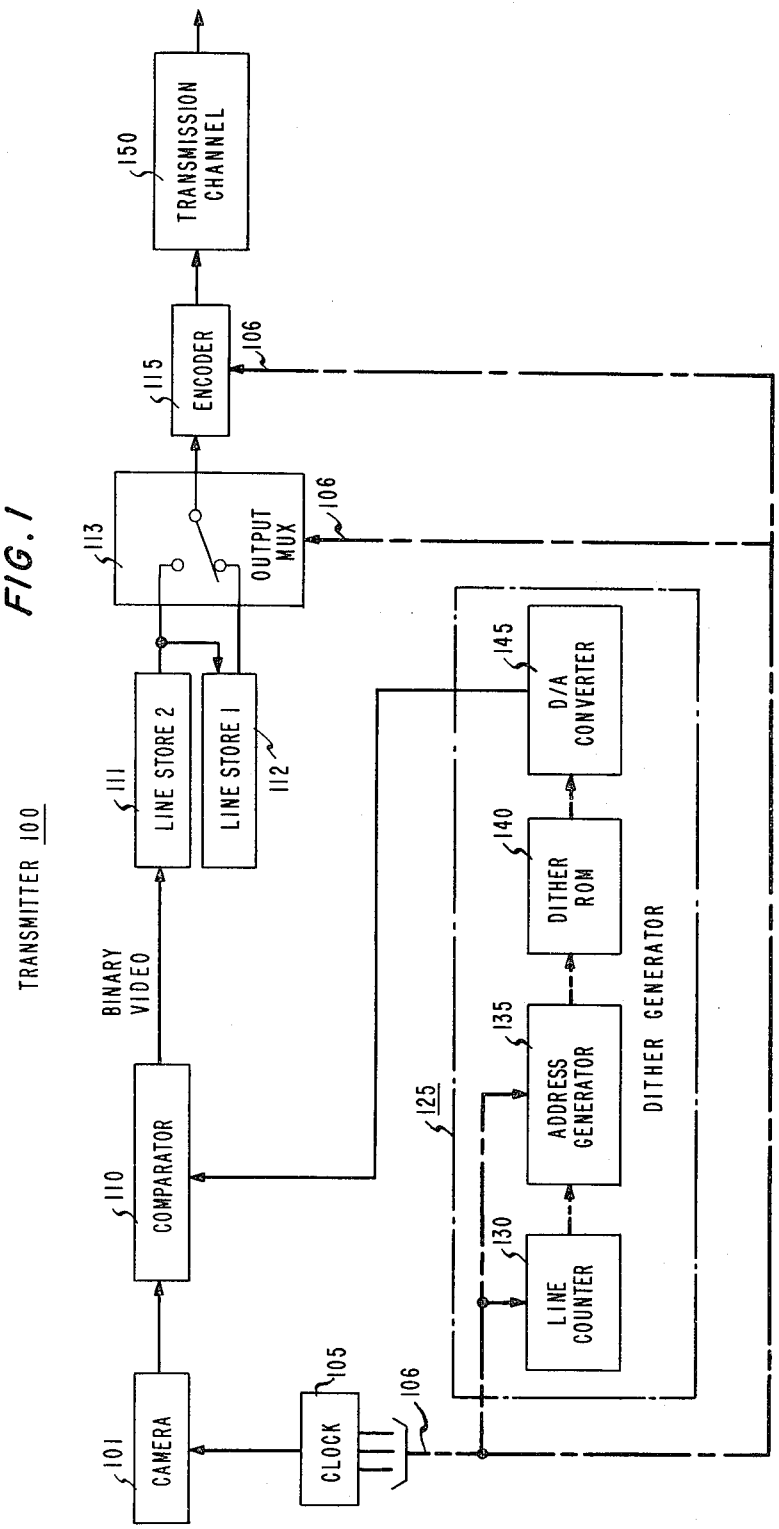
FIG. 1 is an illustrative block diagram showing the major functional components of a first embodiment of the dither display transmission arrangement and the general interaction of these components with each other.

Referring now to FIG. 1, there is shown a dither display arrangement comprising a transmitter 100, a dither generator 125, and a transmission channel 150. Included in the transmitter 100 is a camera 101, which scans a picture image and provides an analog video signal. Transmitter 100 further includes a clock 105 and a dither generator 125, which generates a matrix of dither thresholds as shown in matrix 210 of FIG. 2 and later explained herein. These dither thresholds are compared in comparator 110 with the analog video signal generated by camera 101. The output of comparator 110 is the ordered dither representations of the images scanned by camera 101 which are extended to transmission channel 150 via line stores 111 and 112, encoder 115, and output multiplexer 113.

More particular reference is now made to the dither generator 125. Included in this generator are a three-bit line counter 130, a dither address generator 135, a 64-word by 8-bit read only memory (ROM) 140, and a digital-to-analog converter 145. These components are controlled by the clock 105, which provides both horizontal and vertical synchronization and a sample clock timing signal for the display transmission arrangement.

The line counter 130 and address generator 135 are both initialized to zero at the start of each scan by a vertical synchronizing pulse from the clock 105. The line counter 130 then increments by one for each horizontal synchronizing pulse from the clock 105. A 6-bit counter serves as the address generator 135 and increments each time a pulse of the sample clock timing signal is received from the clock 105. The sample clock timing signal also samples the output of camera 101 approximately 800 times as the camera scans across each horizontal line.

The address generator 135 is controlled by the line counter 130 and starts its count with the binary number provided by the line counter 130. From this start count, eight addresses are generated. Upon receiving eight of the sample clock timing signal pulses, the address generator 135 resets to the start count and continues to generate the same eight addresses for the duration of the line scan. And, when the next horizontal synchronizing pulse occurs, the line counter 130 increments by one and provides a new start count to the address generator 135. Thus incremented, the address generator 135 provides eight new addresses to be repeated for the duration of that line scan. The process repeats in the vertical direction also. Once eight lines are scanned, the address generator is reset to the initial start count and begins generating the first eight addresses once again. The process continues for each subsequent line until the entire page has been scanned.

The address generator 135 provides the control signal for the ROM 140 which contains predetermined position-dependent reference threshold values stored in digital form for an ordered dither matrix. The dither threshold values as shown in matrix 210 of FIG. 2 are converted to an analog signal in the digital-to-analog (D/A) converter 145. As the address generator 135 selects a new word location in the memory device 140, a different 8-bit code is presented to the D/A converter 145, thereby generating at the appropriate time a new threshold voltage for comparison with the video signal from camera 101. The gain and dc level of the threshold voltage is conveniently adjustable in the D/A converter 145 to provide for matching the range of threshold values to the voltage range of the video signal from camera 101. The digital threshold values are converted to analog form prior to comparison in comparator 110 with the signal from camera 101, since the video input signal from the camera 101 is also in analog form. It is apparent, however, that the input signal could be digital, rather than analog, hence eliminating the need for a D/A converter.

In comparator 110, the video input signal from camera 101 is compared to the dither threshold level currently being generated. If the level of the video signal exceeds the particular threshold level, a logic one is generated at the output of the comparator 110. Conversely, if the level of the video signal is less than the particular threshold level, a logic zero is produced. This comparison is made for each of the dither threshold levels produced. The resulting digital stream or ordered dither signal is connected to the first one of two separate line stores 111 and 112.

Figure 3:
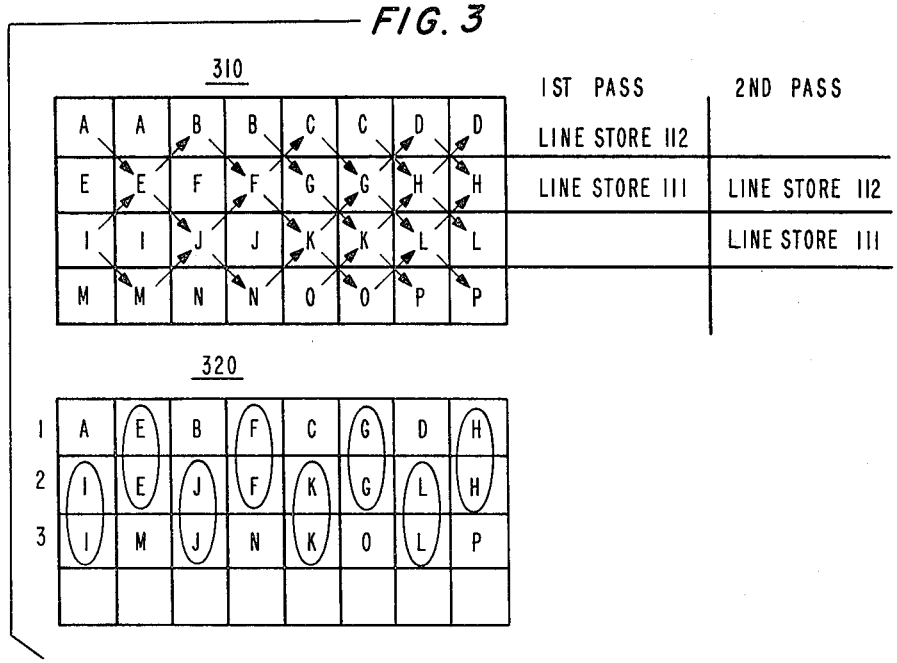
FIG. 3 illustrates one way in which the PELs of an ordered dither signal may be combined in accordance with the invention for flicker elimination.

A complete set of PELs representing an entire line of video is stored in each of two 1600-element line buffer stores 111 and 112. Due to the line stores being operated with a clock signal that is twice the frequency of the sample clock signal, each of adjacent element pairs in the first line store 111 contains the same sample value from the first line of the scanned image. This is also true of the second line store 112, which in this example is filled with samples representing the second line of the scanned image. Reference to the diagrams 310 and 320 of FIG. 3 showing the data in the line stores and how it is fetched should be helpful in understanding this embodiment of applicant's invention.

To produce the first raster line of video for transmission, PEL sample A in diagram 310 is read from line store 111 by output multiplexer 113. Then PEL sample E is read from line store 112 by the multiplexer 113. This alternating between line stores is continued until the first complete line of the display has been read. Meanwhile, a new line of data (third scan line) is being read into line store 111 while the data currently in line store 111 is being transferred to line store 112. The second line of data is then read in the same way as the first from the line stores. The multiplexer continues to alternate between line stores until the entire display page has been read. The resulting arrangement of the PELs for inputting into encoder 115 are shown in diagram 320. Thus it is seen that the PELs with the same intensity are paired on adjacent lines, thereby avoiding flicker in the ordered dither image of an interlaced display. The dither bit stream provided by output multiplexer 113 and the horizontal and vertical synchronization pulses are combined by encoder 115 and encoded into any convenient transmission format. The encoded signal is extended over transmission channel 150 to a receiver (not shown).

Referring once again to FIG. 2, the dither matrix illustrated in diagram 210 is suitable for use in the display transmission arrangement of FIG. 1. The threshold values, representing a range of brightness levels in amplitude values from 0 to 63, are depicted in their assigned sample points. The dithered reference threshold values are used to produce the pleasing subjective impression of overall image texture in a reproduced image and are also used to approximate grayness in the present arrangement. By interrogating the line stores 111 and 112 as earlier explained, the dither thresholds that are stored in ROM 140 and illustrated in diagram 210 provide the effective matrix as illustrated in diagram 220. The result is that the display arrangement performs as if the matrix had twice as many assigned sample points within the same brightness range.

It should be noted that the dither matrix utilized in a dithered display transmission system, such as that shown in FIG. 1, can be chosen to comprise more or fewer than 64 elements, depending upon the needs of the particular application. Advantageously, increasing the number of cells per dither matrix increases the number of shades of gray which are represented in the reproduced image without degrading spatial resolution of the image.

Figure 4:
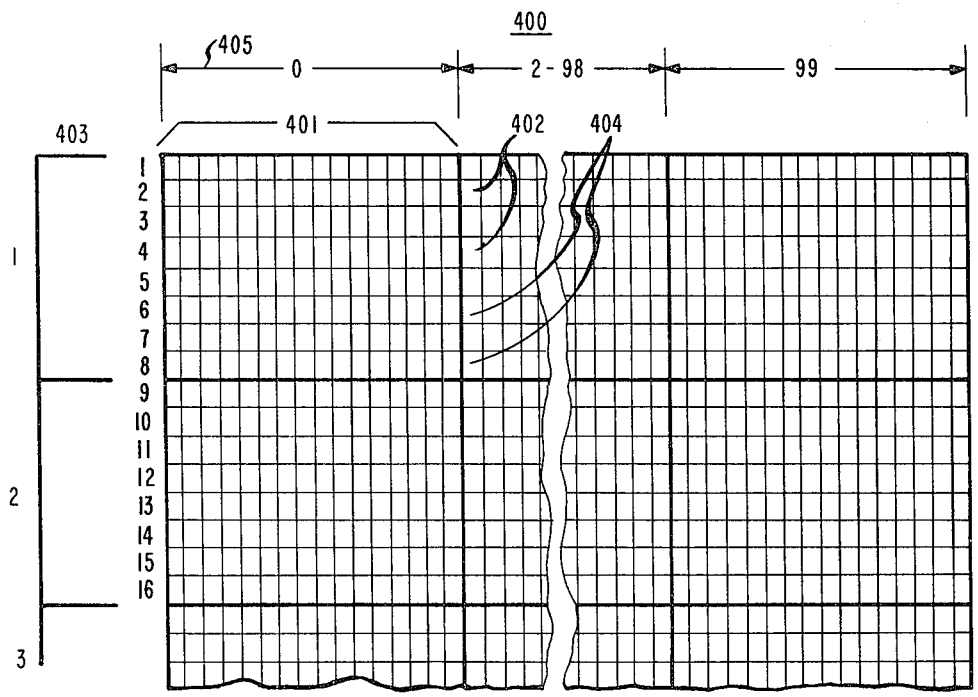
FIG. 4 illustrates a matrix in PELs of an image area and the grouping of the PELs into two-dimensional blocks.

FIG. 4 illustrates the arbitrary grouping of blocks of PELs in an image pictorial area 100. This grouping comprises multiple 16 by 8 arrays of blocks 401 containing PELs 402. The PELs are grouped in this fashion in defining the image pictorial area in the display transmission arrangement system. The blocks 401 are arranged in rows 403 of 100 blocks in each row. Each row 403 of blocks comprises eight scan lines 404 of PELs. In each row 403, the blocks 401 are addressed as 0 to 99 and processed in sequential order from left to right, as denoted by line 405 in the encoder 115 system. The effective ordered dither matrix and its assigned sample points, as shown in diagram 220 of FIG. 2, can be visualized as overlaying a block 401 of PELs 402.

The foregoing describes one embodiment of a dithered display transmission arrangement. Various modifications can be made to this arrangement, however, and practiced within the principles of the present invention. One such modification is the arrangement shown in FIG. 5. Such an arrangement also allows for providing a nearly flickerless ordered dither image for a video display.

Figure 5:
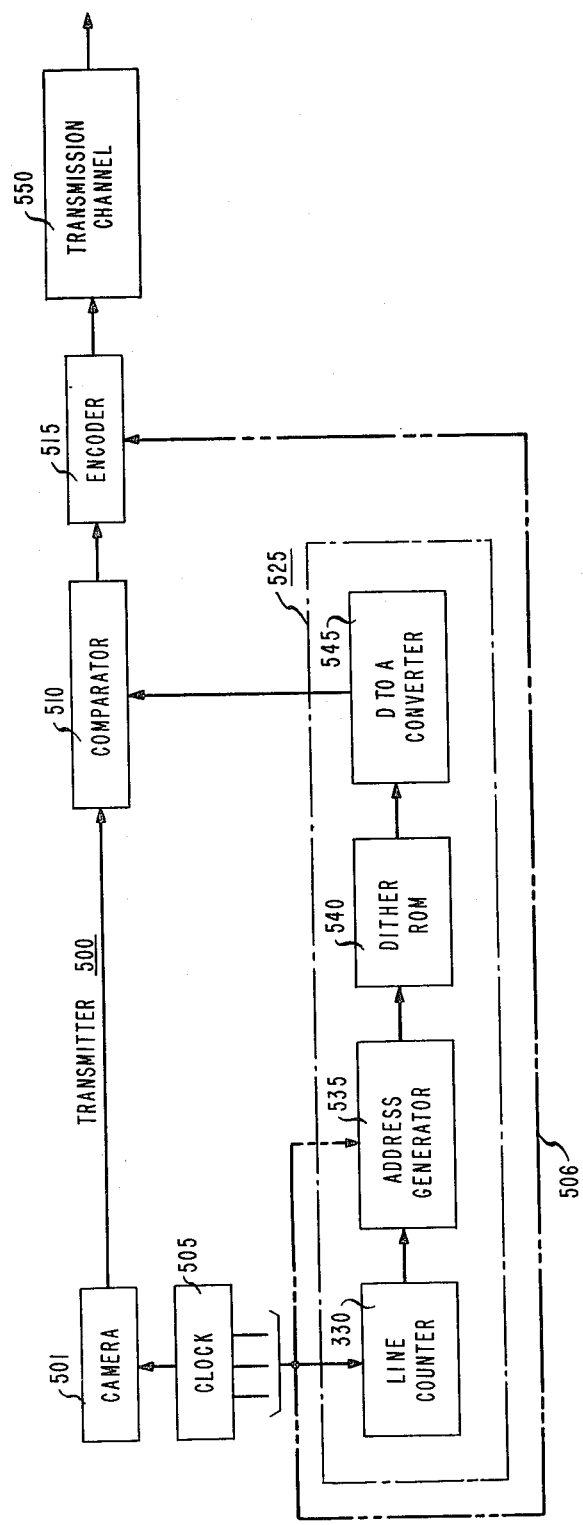
FIG. 5 is an illustrative block diagram showing the major functional components of a second embodiment of the dither display arrangement and general interaction of these components with each other.

The same basic components are used in implementing the circuit arrangement of FIG. 5 and the circuit arrangement of FIG. 1. Because of this and the detailed description given that arrangement, this arrangement will be described in similar detail only where the operation of the component sections differ substantially and sufficient clarity of operation might not be readily apparent from the description provided in that arrangement. Referring now to FIG. 5, there is shown a display transmission arrangement comprising a transmitter 500, a dither generator 525, and a transmission channel 550. Included in the transmitter 500 is a camera 501 which scans a picture image and provides an analog video signal source. Transmitter 500 further includes a clock 505 and a dither generator 525, which directly generates a matrix of dither thresholds as shown in matrix 220 of FIG. 2. These dither thresholds are compared in comparator 510 with the analog video signal generated by camera 501. The output of comparator 510 is the ordered dither representations of the image scanned by camera 501 which is extended to transmission channel 550 via the encoder 515.

The dither generator 525 includes a 3-bit line counter 530, a dither address generator 535, a 128-word by 16-bit read only memory 540 and a digital-to-analog converter 545. These components are controlled by the clock 105 which provides both horizontal and vertical synchronization and a sample clock timing signal for the display transmission arrangement.

In operation, both the line counter 530 and the address generator 535 are initialized to zero at the start of each scan by a vertical synchronizing pulse from the clock 505. The line counter 530 then increments by one for each horizontal synchronizing pulse from the clock 505. A 7-bit counter serves as the address generator 535 and increments each time a pulse of the sample clock timing signal is received from the clock 505. The sample clock timing signal also samples the output of camera 501 approximately 1600 times as the camera scans across each horizontal line. The address generator 535 is controlled by the line counter 530 and starts its count with the binary number provided by the line counter 530. From this start count, 16 addresses are generated. Upon receiving 16 of the sample clock timing signal pulses, the address generator 535 resets to the start count and continues to generate the same 16 addresses for the duration of the line scan. And when the next horizontal synchronizing pulse occurs, the line counter 530 increments by one and provides a new start count to the address generator 535. Thus incremented, the address generator 535 provides 16 new addresses to be repeated for the duration of that line scan. The process repeats in the vertical direction also. Once eight lines are scanned, the address generator is reset to the initial start count and begins generating the first 16 addresses once again. The process continues for each subsequent line until the entire page has been scanned.

The address generator 535 provides the control signal for the memory 540 which contains predetermined position dependent reference threshold values stored in digital form for an ordered dither matrix. The read only memory 540 generates a 16 by 8 matrix of 64 different threshold levels with a new threshold for each sample of the scanned image. The matrix is arranged such that equal value thresholds are paired on adjacent horizontal lines and provides PELs that are in most cases vertically paired in intensity at the output of the display transmission. The arrangement is also configured so that this pairing is continued even as the matrix is repeated. For example, each of the two-dimensional blocks of FIG. 4 using this arrangement has its vertical edge thresholds paired with the thresholds of an equal value in an adjacent two-dimensional block.

The dither threshold values are converted to analog form in the digital-to-analog converter 445 prior to comparison with the video input signal from camera 501, since the signal from the camera 501 is also in analog form. This comparison is obtained through use of comparator 510 which compares the video input signal with the dither threshold level currently being generated. If the level of the video signal exceeds the particular threshold level, a logic one is generated at the output of the comparator 510. Conversely, if the level of the video signal is less than the particular threshold level, a logic zero is produced. This comparison is made for each of the dither threshold levels produced. The resulting ordered dither signal is coupled to the encoder 515 along with the horizontal and vertical synchronizing pulses from the clock 505. Encoder 515 encodes the signal into any convenient transmission format for extension over transmission channel 550 to a receiver.

The embodiments shown and described herein are merely illustrative of the principles of the invention. It will be appreciated that many and varied arrangements in accordance with those principles may be devised by those skilled in the art without departing from the spirit and scope of the invention.

What is claimed is:

1. A system for processing a dithered image for display in a plurality of interlaced scanned lines, the system comprising:
    means for producing an image signal having multiple picture elements;
    means for generating a signal representing a matrix of ordered dither display points from the image signal; and
    means for arranging an ordered plurality of rows in the matrix of ordered dither display points, each one of the display points having an intensity determined in response to the signal generating means and being juxtaposed with a display point having the same intensity on an adjacent row in the ordered plurality.

2. The system of claim 1 wherein the signal generating means includes means for generating a matrix of dithered image thresholds and means for comparing the dithered image thresholds with the image signal.

3. The system of claim 2 wherein the means for generating a matrix of dithered image thresholds comprises memory means containing multiple threshold levels, and address generator means for selecting a desired one of the multiple threshold levels in the memory means.

4. The system of claim 3 wherein the means for arranging an ordered plurality of rows of display points further comprises a first and a second line store for storing the display points and a multiplexer for alternately connecting to the first and the second line store, the multiplexer providing an output signal comprising the display points arranged in an alternating order from the two line stores.

5. The system of claim 4 wherein the display points are stored serially in the first and the second line store, the output of the first line store providing the input to the second line store.

6. The system of claim 3 wherein the multiple threshold levels in the memory means are arranged in a matrix comprising rows and columns, each one of the thresholds in each row being juxtaposed with a threshold of equal level on an adjacent row.

7. A method for processing a dithered image for displaying in a plurality of interlaced scanned lines, the method comprising the steps of:
   producing an image signal representing multiple picture elements;
   generating a signal representing a matrix of ordered dither display points from the image signal; and
   arranging an ordered plurality of rows in the matrix of ordered dither display points, each one of the display points having an intensity determined by the generating step, and each display point being juxtaposed with a display point having the same intensity on an adjacent row in the ordered plurality.

8. The method according to claim 7 wherein the generating step comprises the additional steps of:
   generating a signal representing a matrix of dithered image thresholds; and
   comparing the dithered image threshold signal with the image signal, each one of the display points being produced by the comparison step and having an intensity determined by the instantaneous intensity of the image signal and the level of an instant threshold in the dithered image threshold signal.

9. A system for processing a dithered image for display in a plurality of interlaced scanned lines, the system comprising:
   an input signal representing multiple picture elements;
   means for generating a signal representing a matrix of dithered image thresholds;
   means for comparing the dithered image thresholds with the image signal; and
   means responsive to the comparison means for generating a signal representing an ordered plurality of rows of display points, each one of the display points having an intensity determined in response to the instantaneous intensity of the input signal and the intensity of the dithered image threshold signal, and each display point being juxtaposed with a display point having the same intensity on an adjacent row in the ordered plurality.

10. A method for processing a dithered image for displaying in a plurality of interlaced scanned lines, the method comprising the steps of:
   producing an input signal representing multiple picture elements;
   generating a signal representing a matrix of dithered image thresholds;
   comparing the matrix image threshold signal with the input signal; and
   generating a signal representing an ordered plurality of rows of display points, each one of the display points having an intensity determined by the instantaneous intensity of the input signal and the intensity of the dithered image threshold signal, and each display point being juxtaposed with a display point having the same intensity on an adjacent row in the ordered plurality.

* * * * *